(12) United States Patent
Ono

(10) Patent No.: US 8,614,773 B2
(45) Date of Patent: *Dec. 24, 2013

(54) LIQUID CRYSTAL DISPLAY DEVICE HAVING A PIXEL REGION WITH TWO TFT ELEMENTS AND TWO PIXEL ELECTRODES EACH HAVING SLITS EXTENDING IN TWO DIRECTIONS WHEREIN EACH OF THE TWO TFT ELEMENTS IS CONNECTED TO A DIFFERENT VIDEO SIGNAL LINE

(75) Inventor: Kikuo Ono, Mobara (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,140

(22) Filed: Mar. 2, 2012

(65) Prior Publication Data

US 2012/0162562 A1    Jun. 28, 2012

Related U.S. Application Data

(63) Continuation of application No. 12/247,340, filed on Oct. 8, 2008, now Pat. No. 8,154,677.

(30) Foreign Application Priority Data

Oct. 9, 2007    (JP) .................................. 2007-263030

(51) Int. Cl.
*G02F 1/136*    (2006.01)
*G02F 1/1343*    (2006.01)

(52) U.S. Cl.
USPC .............................. 349/48; 349/141; 349/142

(58) Field of Classification Search
USPC ............................................ 349/48, 139–144
See application file for complete search history.

(56) References Cited

U.S. PATENT DOCUMENTS 5,159,476 A    10/1992    Hayashi et al.
(Continued)

FOREIGN PATENT DOCUMENTS

JP    2-176724    7/1990
JP    7-253571    10/1995
(Continued)

*Primary Examiner* — Paul Lee
(74) *Attorney, Agent, or Firm* — Antonelli, Terry, Stout & Kraus, LLP.

(57) ABSTRACT

A liquid crystal display device having an active matrix display panel with pixel regions having two pixel electrodes and two TFT elements thereon. The two pixel electrodes are formed in each of the pixel regions, the two pixel electrodes are connected to different ones of the two TFT elements and one counter electrode is formed in each of the pixel regions, the counter electrode being formed between a layer of the pixel electrode and a first substrate. Each pixel electrode in the pixel regions has plural slits, the slits in each pixel electrode extending in two directions, and the slits extend in a direction which is not parallel to an extending direction of either of a video signal line or a scanning signal line formed on the first substrate. The two pixel electrodes in the pixel region have adjacent pixel electrode sides which are parallel to each other.

12 Claims, 11 Drawing Sheets

(56) References Cited

U.S. PATENT DOCUMENTS

| | | |
|---|---|---|
| 5,453,857 A | 9/1995 | Takahara |
| 6,232,947 B1 | 5/2001 | Miyawaki et al. |
| 6,590,553 B1 | 7/2003 | Kimura et al. |
| 6,850,302 B2 | 2/2005 | Song |
| 7,113,159 B2 | 9/2006 | Sawabe |
| 7,317,503 B2 | 1/2008 | Lee et al. |
| 7,502,087 B2 | 3/2009 | Kim et al. |
| 7,705,926 B2 | 4/2010 | Kim et al. |
| 8,154,677 B2 * | 4/2012 | Ono ................................. 349/48 |
| 2002/0041354 A1 | 4/2002 | Noh et al. |
| 2002/0085149 A1 | 7/2002 | Kim et al. |
| 2004/0263750 A1 | 12/2004 | Chae |
| 2005/0105032 A1 | 5/2005 | Ono et al. |
| 2005/0243255 A1* | 11/2005 | Ono ............................... 349/141 |
| 2007/0008263 A1 | 1/2007 | Kim |
| 2007/0103631 A1 | 5/2007 | Moon et al. |

FOREIGN PATENT DOCUMENTS

| | | |
|---|---|---|
| JP | 10-197894 | 7/1998 |
| JP | 2002-62518 | 2/2002 |
| JP | 2003-5214 | 1/2003 |
| JP | 2003-295160 | 10/2003 |
| JP | 2004-38165 | 2/2004 |
| JP | 2004-185011 | 7/2004 |
| JP | 2005-148534 | 6/2005 |
| JP | 2005-308951 | 11/2005 |
| JP | 2005-346064 | 12/2005 |
| JP | 2006-018287 | 1/2006 |
| JP | 2006-309239 | 11/2006 |
| JP | 2007-156468 | 6/2007 |
| KR | 10-2006-0119399 | 11/2006 |

* cited by examiner

LIQUID CRYSTAL DISPLAY DEVICE HAVING A PIXEL REGION WITH TWO TFT ELEMENTS AND TWO PIXEL ELECTRODES EACH HAVING SLITS EXTENDING IN TWO DIRECTIONS WHEREIN EACH OF THE TWO TFT ELEMENTS IS CONNECTED TO A DIFFERENT VIDEO SIGNAL LINE

This application is a continuation of U.S. application Ser. No. 12/247,340, filed Oct. 8, 2008, now U.S. Pat. No. 8,154,677, the contents of which are incorporated herein by reference.

The present application claims priority over Japanese application JP 2007-263030 filed on Oct. 9, 2007, the contents of which are hereby incorporated into this application by reference.

BACKGROUND OF THE INVENTION (1) Field of the Invention

The present invention relates to a liquid crystal display device, and in particular, to a technology which is effective when applied to an active matrix type TFT liquid crystal display device.

(2) Related Art Statement

Conventional liquid crystal display devices having a liquid crystal display panel where a liquid crystal material is sealed between a pair of substrates include active matrix type TFT liquid crystal display devices. The above described active matrix type TFT liquid crystal display devices (hereinafter simply referred to as liquid crystal display devices) are used for monitors, such as televisions and PC's (personal computers), and displays for portable electronics, such as portable phones.

In the liquid crystal display panels used in the above described liquid crystal display devices, a number of scanning signal lines, a number of video signal lines, a number of TFT elements (active elements) and a number of pixel electrodes are provided on one substrate (hereinafter referred to as TFT substrate) from among the above described pair of substrates in such a manner that the set of pixels having the above described TFT elements and pixel electrodes connected to the above described TFT elements form a display region.

In addition, a light blocking film (which may be referred to as black matrix) and color filters, for example, are provided on the other substrate (hereinafter referred to as a facing substrate) from among the above described pair of substrates in the above described liquid crystal display panels. The above described light blocking film is formed of, for example, a conductor or an insulator in mesh form which divides the display region into microscopic regions for each pixel, and in general, extends in such locations as to overlap (face) scanning signal lines, TFT elements and video signal lines on the above described TFT substrate. In addition, the color filters are provided to liquid crystal display panels for color display, and in the case of an RGB type color liquid crystal display panel, for example, red (R), green (G) and blue (B) color filters are provided.

In addition, in the case where the above described liquid crystal display panel is of a drive system, which is referred to as a longitudinal electrical field drive system (for example, VA system or TN system), counter electrodes (which may also be referred to as common electrodes) which make pairs with the above described pixel electrodes are provided on the above described facing substrate. In addition, in the case where the above described liquid crystal display panel is of a drive system (for example, IPS system), which is referred to as a lateral electrical field drive system, the above described counter electrodes are provided on the above described TFT substrate.

In addition, in the case of conventional general liquid crystal display devices, one TFT element and one pixel element are effective in one pixel. In the liquid crystal display devices that have been proposed in recent years, however, one pixel is divided into two sub-pixels so that two effective TFT elements and two effective pixel electrodes are provided in this one pixel (see, for example, Patent Document 1).
(Patent Document 1) Japanese Unexamined Patent Publication 2006-309239
(Corresponding U.S. Application US2007/0008263 A1)

SUMMARY OF THE INVENTION

Problem to Be Solved by the Invention

In the case of conventional general liquid crystal display devices, the region occupied by one pixel in the above described TFT substrates is usually equal to a region surrounded by two adjacent scanning signal lines and two adjacent video signal lines. At this time, the TFT element in one pixel has a gate that is connected to one scanning signal line from among the two adjacent scanning signal lines and a drain (or source) that is connected to one video signal line from among the two adjacent video signal lines. In addition, the source (or drain) of the above described TFT element is connected to a pixel electrode.

That is to say, in the case of the conventional general liquid crystal display devices, scanning signal lines, of which the number is the same as the number of pixels aligned in the direction in which the above described video signal lines extend, are provided on the above described TFT substrate at approximately the same intervals as the size of one pixel in the direction in which the above described video signal lines extend.

In addition, the TFT elements of the respective pixels are provided in the vicinity of each scanning signal line. Therefore, in the case of the conventional general liquid crystal display devices, one opening region in the light blocking film provided on the above described facing substrate becomes smaller than the region occupied by one pixel.

Accordingly, the region occupied by one pixel becomes smaller due to, for example, an increase in the resolution of the liquid crystal display device, the ratio of the opening in each pixel becomes smaller, and such a problem arises that the screen becomes darker.

In addition, in the case where the ratio of the opening in each pixel is small, for example, such a problem arises that it becomes necessary to provide a backlight having a light source with high brightness in order to make the screen brighter.

An object of the present invention is to provide a technology which makes it possible to increase the ratio of the opening in each pixel in a liquid crystal display device, for example.

The above described and other objects as well as the novel features of the present invention will be clarified by the description in the present specification and the accompanying drawings.

Means for Solving Problem

Typical inventions disclosed in the present specification are outlined in the following.

(1) A liquid crystal display device, including a liquid crystal display panel in which a liquid crystal material is sealed between a first substrate and a second substrate, the above described first substrate having a number of scanning signal lines, a number of video signal lines, a number of TFT elements and a number of pixel electrodes, the above described second substrate having a light blocking film which extends in such locations as to overlap the above described number of scanning signal lines and the above described number of video signal lines, and the above described liquid crystal display panel having a display region formed of a set of pixels having the above described TFT elements and pixel electrodes connected to the above described TFT elements, wherein TFT elements of two pixels which are adjacent with one scanning signal line in between respectively have a gate connected to the scanning signal line and either a source or a drain connected to a different video signal line, and between two adjacent scanning signal lines, a pixel having a TFT element of which the gate is connected to one scanning signal line of the two scanning lines and another pixel having a TFT element of which the gate is connected to the other scanning signal line are aligned in the direction in which the above described video signal lines extend, and either the sources or the drains of the two TFT elements are connected to different video signal lines.

(2) The liquid crystal display device according to the above described (1), wherein two video signal lines run between the pixel electrodes of two pixels which are adjacent to each other in the direction in which the above described scanning signal lines extend, and the pixel electrode of each pixel is sandwiched between two adjacent video signal lines, and in one pixel column made up of a number of pixels aligned in the direction in which the above described video signal lines extend, pixels having a TFT element of which the source or drain is connected to one video signal line from among two video signal lines which are adjacent to each other with the pixel electrode of a pixel included in the pixel column in between and pixels having a TFT element of which the source or drain is connected to the other video signal line from among the two video signal lines alternate.

(3) A liquid crystal display device, including a first substrate and a second substrate which sandwich a liquid crystal material, a number of video signal lines, a number of scanning signal lines, a number of TFT elements and pixel electrodes connected to the TFT elements being formed on the above described first substrate, wherein the above described number of video signal lines and the above described number of scanning signal lines are formed in a matrix with regions surrounded by the video signal lines and the scanning signal lines being pixel regions, and two TFT elements and two pixel electrodes which are respectively connected to the two TFT elements are formed in each of the above described pixel regions.

(4) The liquid crystal display device according to (3), wherein the two TFT elements in one of the above described pixel regions are respectively formed above two scanning signal lines provided within the pixel region so as to face each other.

(5) The liquid crystal display device according to (3), wherein two TFT elements are formed between the above described video signal lines and above the above described scanning signal lines.

(6) The liquid crystal display device according to (5), wherein two TFT elements formed between the above described video signal lines and above the above described scanning signal lines are respectively connected to the pixel electrodes in two pixel regions provided on the two sides of the scanning signal line at the center.

(7) The liquid crystal display device according to (3), wherein two video signal lines are formed between the above described pixel regions.

(8) The liquid crystal display device according to (3), wherein one counter electrode is formed in the above described pixel regions.

(9) The liquid crystal display device according to (3), wherein each pixel electrode in the above described pixel regions has a number of slits, the slits in each pixel electrode extending in two directions.

(10) The liquid crystal display device according to (9), wherein the above described slits extend in the direction which is not parallel to either the above described video signal lines or the above described scanning signal lines.

(11) The liquid crystal display device according to (3), wherein a light blocking film is formed on the above described second substrate, the above described light blocking film being formed in such locations as to overlap the above described video signal lines and the above described scanning signal lines.

Effects of the Invention

In the liquid crystal display device according to the present invention, the ratio of the openings in each pixel can be increased.

EXPLANATION OF SYMBOLS

Figure 1A:
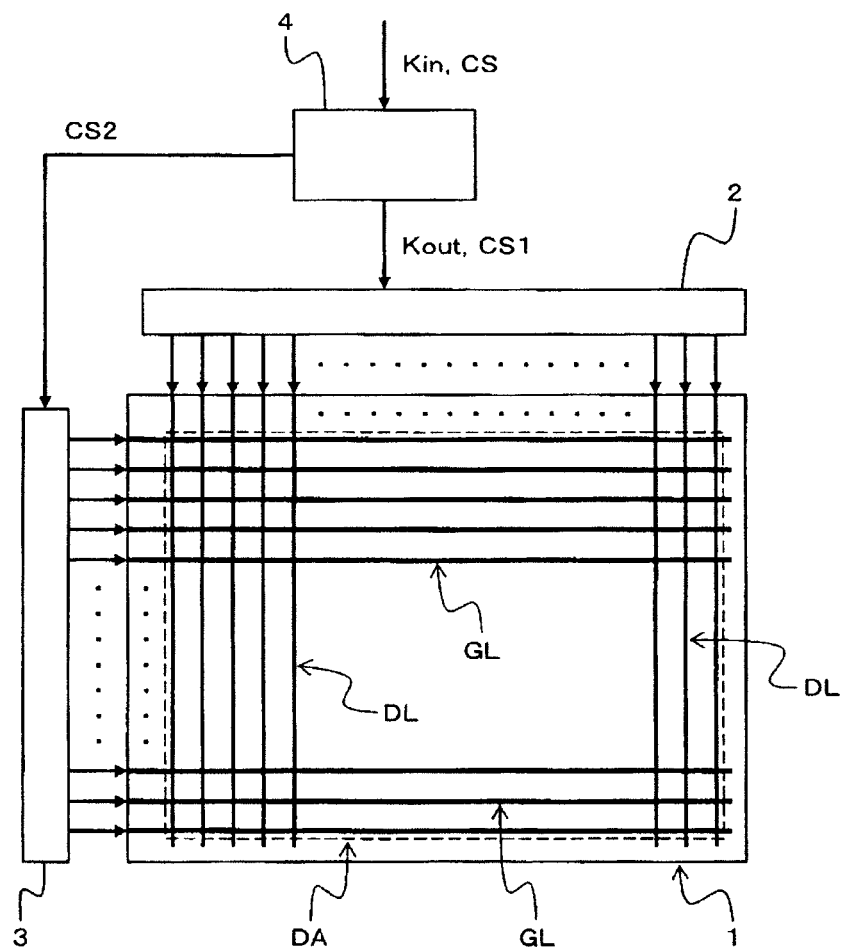
FIG. 1(a) is a schematic block diagram showing an example of a schematic configuration of a liquid crystal display device.

1 . . . liquid crystal display panel
101 . . . TFT substrate
102 . . . facing substrate
103 . . . sealing material
104 . . . lower polarizing plate
105 . . . upper polarizing plate
LC . . . liquid crystal material
SUB1, SUB2 . . . insulating substrates
GL, $GL_0$, $GL_1$, $GL_2$, $GL_3$, $GL_4$ . . . scanning signal lines
DL, $DL_1$, $DL_2$, $DL_3$, $DL_4$, $DL_5$ . . . video signal lines
PAS1 . . . first insulating layer
SC . . . semiconductor layer
SD1 . . . drain electrode
SD2 . . . source electrode
PAS2 . . . second insulating layer
PX . . . pixel electrode
CT . . . counter electrode
SL . . . capacitance maintaining line
BM . . . light blocking film
CF . . . color filter
ORI1, ORI2 . . . orientation films
Tr . . . TFT element
$C_{LC}$ . . . pixel capacitance
PB . . . pixel border
2 . . . data driver
3 . . . gate driver
4 . . . control circuit substrate

DETAILED DESCRIPTION OF THE INVENTION

Best Mode for Carrying Out the Invention

In the following, the present invention is described in detail together with the embodiments (examples) in reference to the drawings.

Here, throughout the drawings for describing the examples, the same symbols are attached to the components having the same functions, and the descriptions are not repeated.

Figure 1B:
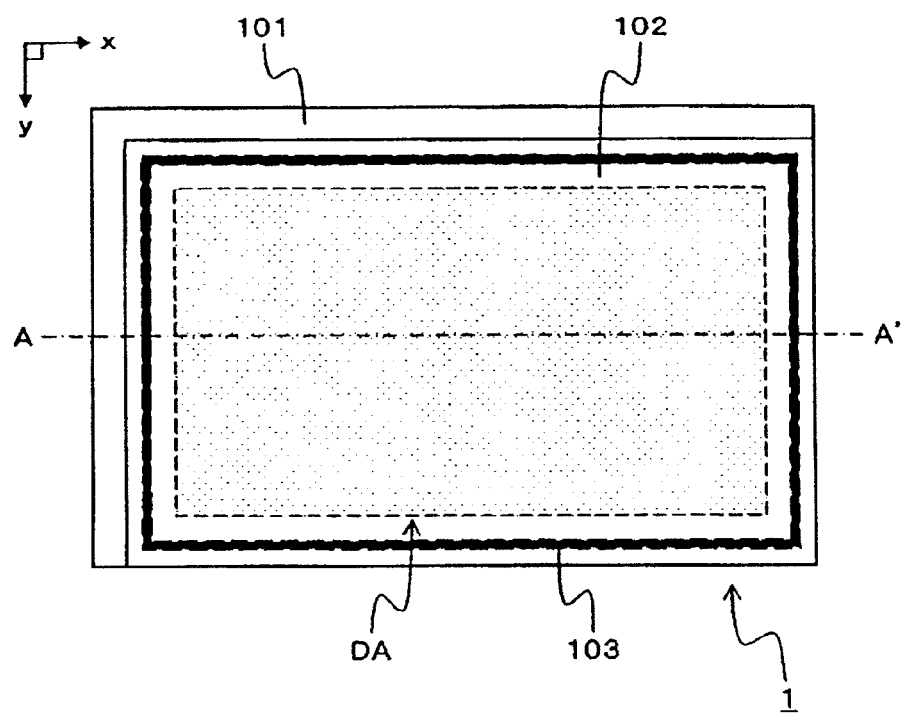
FIG. 1(b) is a schematic plan diagram showing an example of a schematic configuration of a liquid crystal display panel.
Figure 1C:
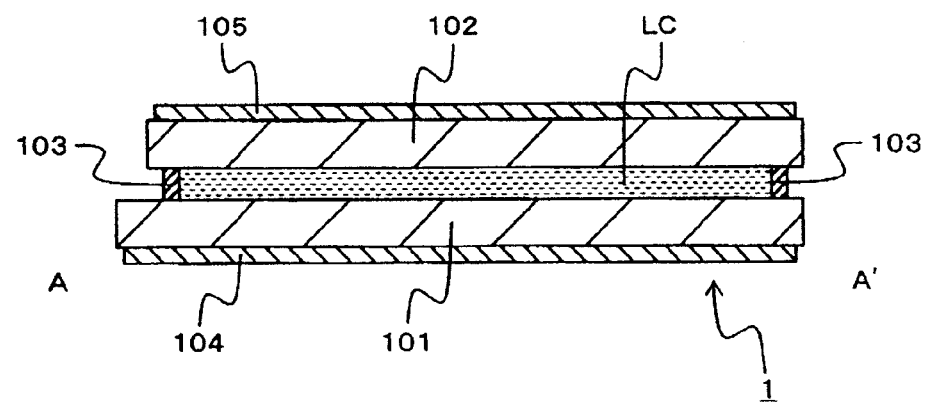
FIG. 1(c) is a schematic cross sectional diagram showing an example of the configuration of the liquid crystal display panel along line A-A' in FIG. 1(b)

FIGS. 1(a) to 1(c) are schematic diagrams for describing an example of a schematic configuration of the liquid crystal display device according to the present invention. FIG. 1(a) is a schematic block diagram showing an example of a schematic configuration of the liquid crystal display device. FIG. 1(b) is a schematic plan diagram showing an example of a schematic configuration of the liquid crystal display panel. FIG. 1(c) is a schematic cross sectional diagram showing an example of the configuration of the liquid crystal display panel along line A-A' in FIG. 1(b).

The liquid crystal display device according to the present invention has a liquid crystal display panel 1, a data driver 2, a gate driver 3 and a control circuit substrate 4 as shown in FIG. 1(a), for example. Here, in the case where the liquid crystal display device is of a transmission type or of a semi-transmission type, the liquid crystal display device has a backlight unit (light source) and the like in addition to the above, though omitted in FIG. 1(a).

The liquid crystal display panel 1 has a number of scanning signal lines GL and a number of video signal lines DL, and the region surrounded by the two scanning signal lines which are placed on the outermost sides and the two video signal lines which are placed on the outermost sides corresponds to the display region DA for an image or a video (display screen), for example. In addition, though omitted in FIG. 1(a), a TFT element and a pixel capacitance (which may be referred to as liquid crystal capacitance) which function as an active element are provided in each pixel that forms the display region DA.

In addition, the liquid crystal display panel 1 is a display panel in which a liquid crystal material LC is sealed between a TFT substrate 101 and a facing substrate 102 as shown in FIGS. 1(b) and 1(c), for example. At this time, the TFT substrate 101 and the facing substrate 102 are made to adhere by an annular sealing material 103 surrounding the display region DA so that the liquid crystal material LC is sealed airtight in the space surrounded by the TFT substrate 101, the facing substrate 102 and the sealing material 103. Here, in the liquid crystal display panel 1 shown in FIG. 1(b), the direction x is the direction in which the respective scanning signal lines GL extend and the direction y is the direction in which the respective video signal lines DL extend.

In addition, in the case where the liquid crystal display device is of a transmission type or of a semi-transmission type, a lower polarizing plate 104 and an upper polarizing plate 105 are respectively provided on the surfaces of the TFT substrate 101 and the facing substrate 102 facing outwards; in other words, on the rear surfaces of the substrates facing the liquid crystal material LC. At this time, one or more layers of phase difference plates may be provided between the TFT substrate 101 and the lower polarizing plate 104 and between the facing substrate 102 and the upper polarizing plate 105, respectively.

In addition, in the case where the liquid crystal display device is of a reflective type, the lower polarizing plate 104 is generally unnecessary, and only the upper polarizing plate 105 and a phase difference plate (not shown) are provided on the facing substrate 102 side.

The data driver 2 is a drive circuit for generating a video signal, which is applied to each video signal line DL, and controlling the timing according to which the signal is applied. In addition, the gate driver 3 is a drive circuit for controlling the period during which the gate of the TFT element is turned on in the scanning signal applied to each scanning signal line GL, for example.

In addition, the control circuit substrate 4 is a printed circuit board, which is generally referred to as timing controller (T-CON) substrate, and has a circuit which generates a clock signal CS1 for controlling the operation of the data driver 2 and a clock signal CS2 for controlling the operation of the gate driver 3 on the basis of the clock signal CS inputted from the outside of the liquid crystal display device and outputs the signals to the data driver 2 and the gate driver 3, for example. In addition to this, the control circuit substrate 4 has a circuit which converts the input gradation data Kin inputted from the outside of the liquid crystal display device to an output gradation data Kout which matches the type of display and outputs the resulting data to the data driver 2, and supplies part of the power voltage V inputted from the outside of the liquid crystal display device to the data driver 2 and the gate driver 3, for example.

Figure 2A:
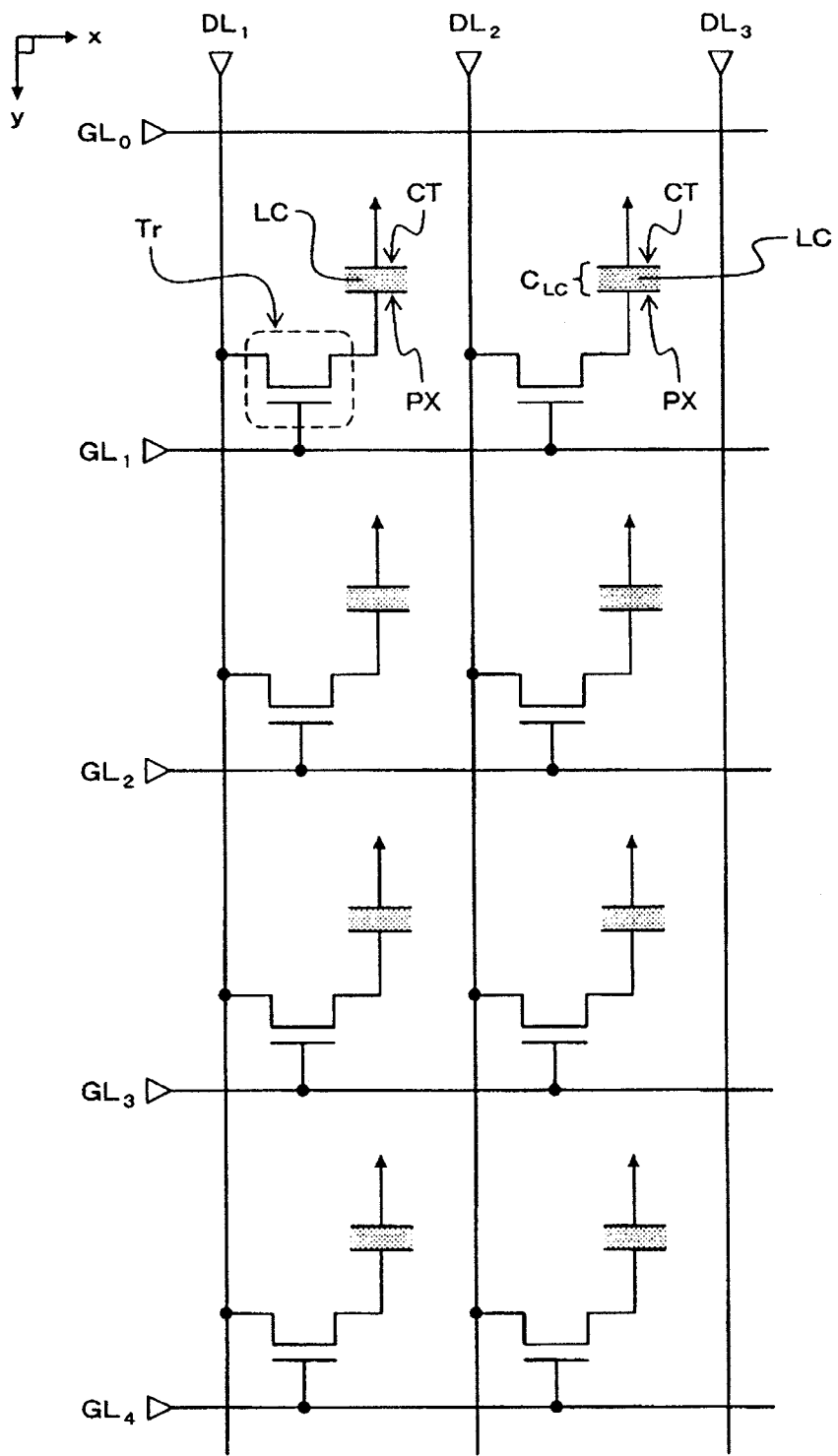
FIG. 2(a) is a schematic circuit diagram showing an example of the circuit configuration of each pixel in a conventional liquid crystal display panel.
Figure 2B:
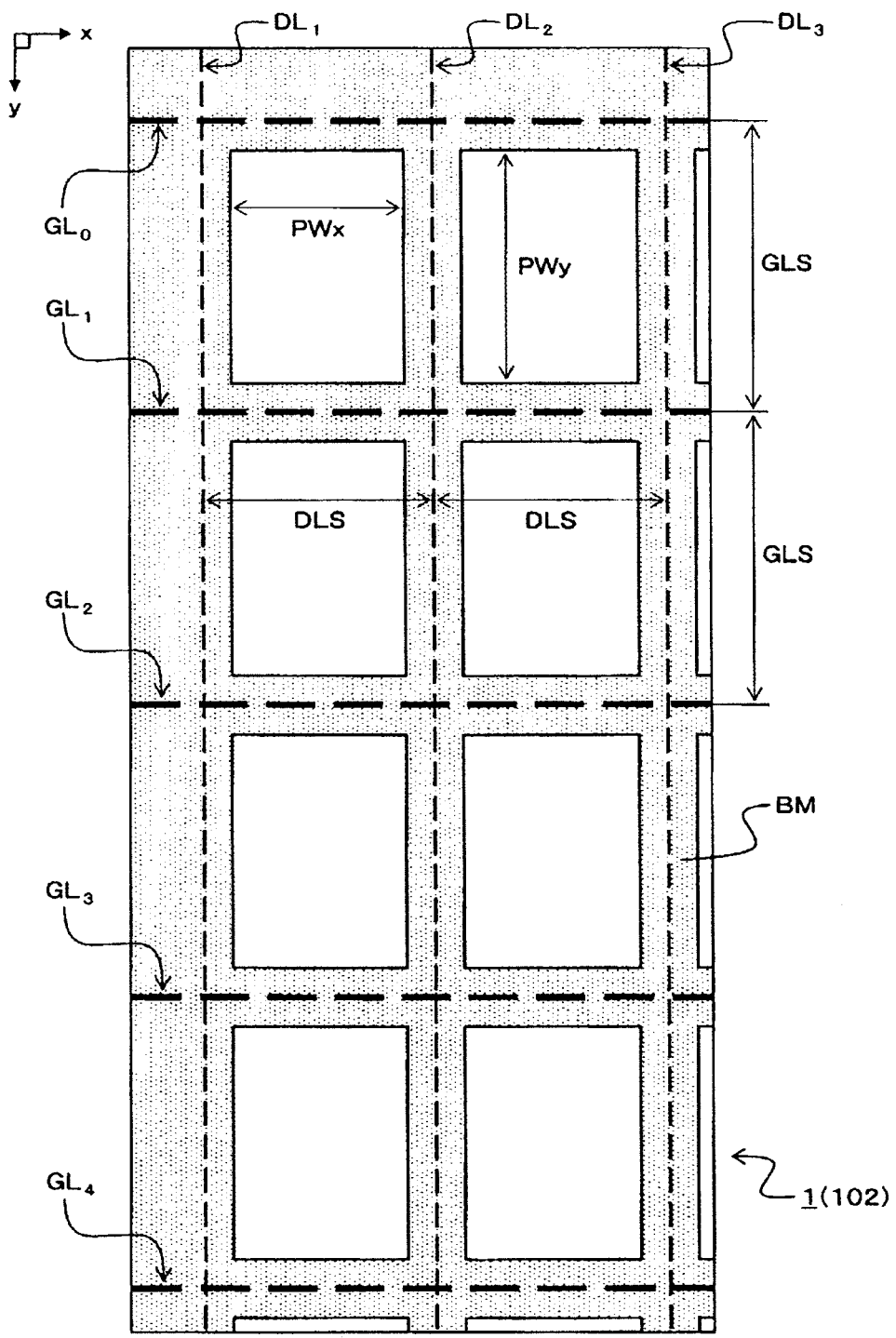
FIG. 2(b) is a schematic plan diagram showing an example of the configuration of each pixel in a conventional liquid crystal display panel as viewed from the facing substrate side.

FIGS. 2(a) and 2(b) are schematic diagrams showing an example of the configuration of each pixel in a conventional liquid crystal display panel. FIG. 2(a) is a schematic circuit diagram showing an example of the circuit configuration of each pixel in the conventional liquid crystal display panel. FIG. 2(b) is a schematic plan diagram showing an example of the configuration of each pixel in the conventional liquid crystal display panel as viewed from the facing substrate side. Here, FIGS. 2(a) and 2(b) show the circuit configuration for eight pixels, that is, two pixels in the width by four pixels in the length, in the upper left corner portion of the display region DA shown in FIGS. 1(a) and 1(b). In addition, in the case it is necessary to distinguish the number of scanning signal lines GL from each other in the descriptions in reference to FIGS. 2(a) and 2(b), the symbols of the respective scanning signal lines are denoted by $GL_n$ (n is either 0, 1, 2, 3 or 4), and in the case where it is necessary to distinguish the number of video signal lines DL, the symbols of the respective video signal lines are denoted by $DL_m$ (m is any of 1, 2 and 3).

A region occupied by one pixel in the conventional active matrix type TFT liquid crystal display panels (liquid crystal display devices) corresponds to a region surrounded by two adjacent scanning signal lines GL and two adjacent video signal lines DL (for example, the region surrounded by the scanning signal lines $GL_1$ and $GL_2$ as well as the video signal lines $DL_1$ and $DL_2$) as shown in FIG. 2(a), for example. Here, the scanning signal line $GL_o$ shown in FIG. 2(a) is a dummy scanning signal line which is provided so that the pixels located above the scanning signal line $GL_1$ have the same circuit configuration as the pixels located beneath the scanning signal lines $GL_1$, for example.

At this time, one TFT element Tr and one pixel capacitance $C_{LC}$ are provided in one pixel, for example. The TFT element Tr has a gate connected to one scanning signal line GL from among the two adjacent scanning signal lines GL and a drain connected to one video signal line DL from among the two adjacent video signal lines DL. In addition, the pixel capacitance $C_{LC}$ is formed of a pixel electrode PX connected to the source of the TFT element Tr, a liquid crystal material LC and a counter electrode CT provided on either the TFT substrate 101 or the facing substrate 102.

Here, though in the present specification, the drain of the TFT element Tr is connected to the video signal line DL and the source is connected to the pixel electrode PX, the opposite case is possible, that is to say, the source may be connected to the video signal line DL and the drain may be connected to the pixel electrode PX. In addition, in actual liquid crystal display devices, the sources and the drains are periodically switched depending on the relationships in the potential between the video signal (gradation voltage) applied to the video signal line DL and the common voltage applied to the counter electrode CT.

In the case where the liquid crystal display device is of a longitudinal electrical field drive system, the scanning signal lines GL, the video signal lines DL, the TFT elements Tr and the pixel electrodes PX, for example, in the configuration shown in FIG. 2(a) are provided on the TFT substrate 101. In addition, in the case where the liquid crystal display device is of a lateral electrical field drive system, the scanning signal lines GL, the video signal lines DL, the TFT elements Tr, the pixel electrodes PX and the counter electrodes CT, for example, in the configuration shown in FIG. 2(a) are provided on the TFT substrate 101. In addition, in either case, the scanning signal lines GL, the video signal lines DL, the TFT elements Tr and the pixel electrodes PX are provided so that the plan layout on the TFT substrate 101 reflects the circuit configuration shown in FIG. 2(a).

In addition, a light blocking film in mesh form which extends in such locations as to overlap (face) the scanning signal lines GL and the video signal lines DL is provided on the facing substrate 102 as described above. Therefore, the configuration of the liquid crystal display panel 1 is that of the one shown in FIG. 2(b) when viewed from the facing substrate 102 side, and in this configuration, for example, a light blocking film BM is provided in the region that is hatched. Here, in FIG. 2(b), thick dotted lines extending in the direction x and dotted lines extending in the direction y in FIG. 2(b) are the scanning signal lines $GL_n$ and the video signal lines $DL_m$ in FIG. 2(a), respectively. In addition, white rectangular regions surrounded by the light blocking film BM are openings through which light from a backlight unit, for example, transmits, and thus, are regions which are responsible for the gradation display in each pixel.

In addition, in the case where the conventional liquid crystal display device corresponds to a color display, a number of pixels aligned in the direction in which the video signal lines DL extend (direction y) are responsible for the gradation display for the same color from among the basic colors in the color display. That is to say, in the case of an RGB type color liquid crystal display device, a number of pixels between the two adjacent video signal lines $DL_1$ and $DL_2$ are respectively responsible for the gradation display for the same color (for example, red).

Incidentally, in the conventional liquid crystal display device (liquid crystal display panel 1) as shown in FIG. 2(b), the opening in one pixel has a size PWx in the lateral direction (direction x) which is smaller than the gap GLS between two adjacent scanning signal lines GL and a size PWy in the longitudinal direction which is smaller than the gap DLS between two adjacent video signal lines DL. Therefore, in the case where the gap GLS between two adjacent scanning signal lines GL and the gap DLS between two adjacent video signal lines DL become smaller due to an increase in the resolution, for example, the area of the opening in each pixel becomes smaller, and thus, such a problem arises that the ratio of the opening lowers.

Example

Figure 3A:
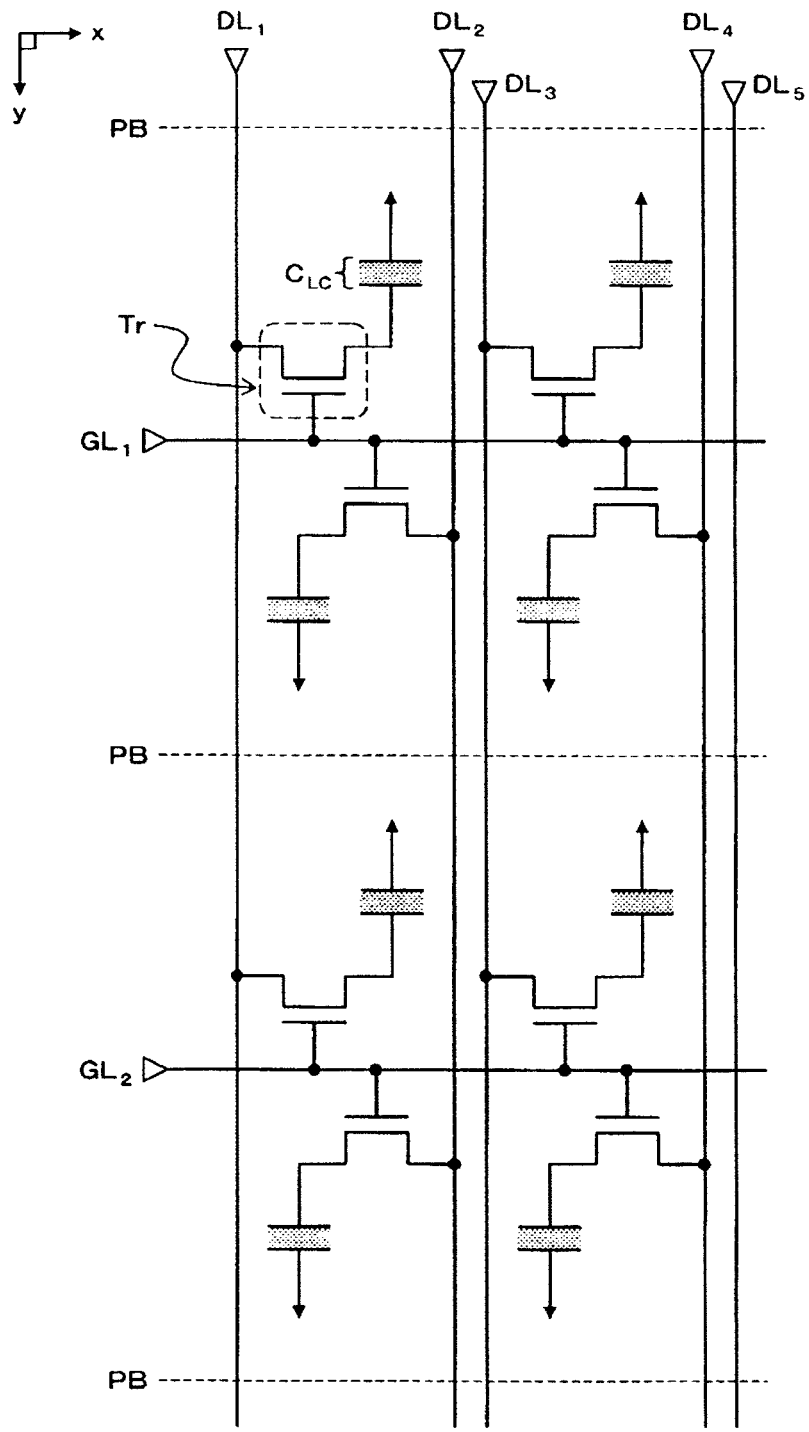
FIG. 3(a) is a schematic circuit diagram showing an example of the circuit configuration of each pixel in the liquid crystal display panel according to the present example.
Figure 3B:
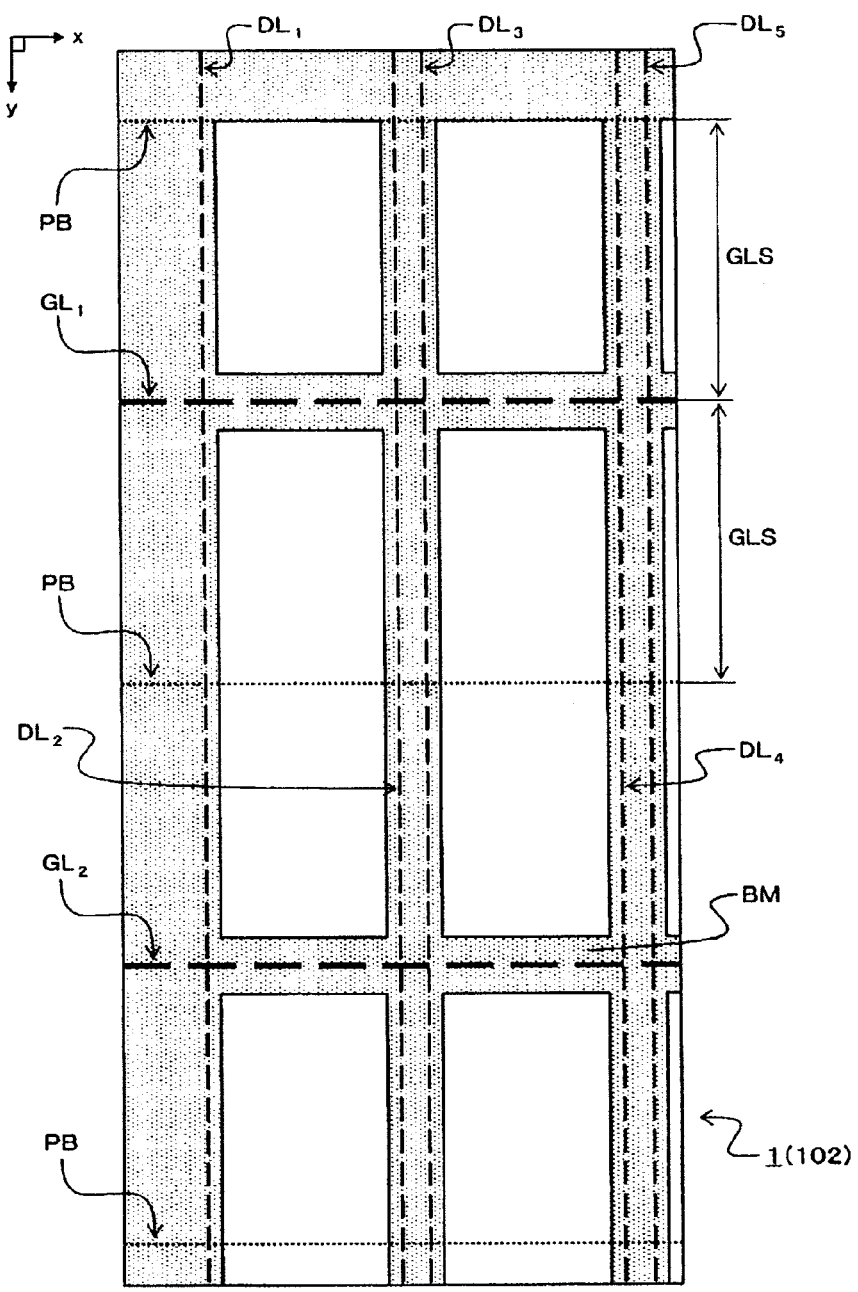
FIG. 3(b) is a schematic plan diagram showing an example of the configuration of each pixel in the liquid crystal display panel according to the present example as viewed from the facing substrate side.

FIGS. 3(a) and 3(b) are schematic diagrams showing an example of the configuration of the liquid crystal display panel according to one example of the present invention. FIG. 3(a) is a schematic circuit diagram showing an example of the circuit configuration of each pixel in the liquid crystal display panel according to the present example. FIG. 3(b) is a schematic plan diagram showing an example of the configuration of each pixel in the liquid crystal display panel according to the present example as viewed from the facing substrate side. Here, FIGS. 3(a) and 3(b) show the circuit configuration for eight pixels, that is to say, two pixels in the width by four pixels in the length in the upper left corner portion of the display region DA shown in FIGS. 1(a) and 1(b). In addition, in the case where it is necessary to distinguish a number of scanning signal lines GL from each other in the descriptions in reference to FIGS. 3(a) and 3(b), the symbols of the respective scanning signal lines are denoted by $GL_n$ (n is either 1 or 2), and in the case where it is necessary to distinguish a number of video signal lines DL from each other, the symbols of the respective scanning signal lines are denoted by $DL_m$ (m is any of 1, 2, 3, 4 and 5).

In the liquid crystal display panel 1 according to the present example, the number of scanning signal lines GL is reduced to half the number of the pixels aligned in the direction in which the video signal lines DL extend (direction y) as shown in FIG. 3(a), for example, so as to be provided at a ratio of 1 for 2 pixels aligned in the direction in which the video signal lines DL extend.

In addition, the number of video signal lines DL is increased to two times greater than the number of pixels aligned in the direction in which the scanning signal lines GL extend (direction x). At this time, the respective video signal lines DL are provided so that the pixel electrode PX for one pixel is sandwiched between two adjacent video signal lines and two video signal lines run between the pixel electrodes PX of two pixels which are adjacent in the direction in which the scanning signal lines GL extend.

In addition, in the liquid crystal display panel 1 according to the present example also, one TFT element Tr and one pixel capacitance CLC are provided to one pixel, for example, so that the region occupied by one pixel corresponds to a region surrounded by one scanning signal line GL, a pixel border PB which is adjacent to the scanning signal line GL, and two video signal lines DL which are adjacent to each other with the pixel electrode PX in between. That is to say, in the liquid crystal display panel 1 according to the present example, when a region surrounded by two adjacent scanning signal lines GL (for example, scanning signal lines $GL_1$ and $GL_2$) and two adjacent video signal lines DL (for example, video signal lines $DL_1$ and $DL_2$) is one pixel region, two TFT elements Tr and two pixel electrodes PX are provided in this one pixel region.

Here, in the liquid crystal display panel 1 according to the present example, two video signal lines DL (for example, video signal lines $DL_1$ and $DL_2$) are allocated for one pixel column made up of a number of pixels aligned in the direction in which the video signal lines extend (direction y), and pixels having a TFT element of which the drain is connected to one of the above described two video signal lines and pixels having a TFT element of which the drain is connected to the other video signal line alternate in this one pixel column.

In addition, in the above described one pixel column, the gates of the TFT elements in two pixels which are adjacent to each other with one scanning signal line GL in between are connected to the same scanning signal line GL and the drains are connected to different video signal lines.

In addition, between two adjacent scanning signal lines GL in the above described one pixel column, a pixel having a TFT element of which the gate is connected to one of the two scanning signal lines GL and a pixel having a TFT element of which the gate is connected to the other scanning signal line GL are aligned. At this time, the drains of the TFT elements in the two pixels between the two adjacent scanning signal lines GL are connected to different video signal lines.

In the case where the liquid crystal display device is of a longitudinal electrical field drive system, the scanning signal lines GL, the video signal lines DL, the TFT elements Tr and the pixel electrodes PX, for example, in the configuration shown in FIG. 3(a) are provided on the TFT substrate 101. In addition, in the case where the liquid crystal display device is of a lateral electrical field drive system, the scanning signal lines GL, the video signal lines DL, the TFT elements Tr, the pixel electrodes PX and the counter electrodes CT, for example, in the configuration shown in FIG. 3(a) are provided on the TFT substrate 101. In addition, in either case, the scanning signal lines GL, the video signal lines DL, the TFT elements Tr and the pixel electrodes PX are provided so that the plan layout on the TFT substrate 101 reflects the circuit configuration shown in FIG. 3(a).

At this time, the configuration of the liquid crystal display panel 1 as viewed from the facing substrate 102 side is one of that as shown in FIG. 3(b), for example, when a light blocking film BM is provided on the facing substrate 102 in such locations as to overlap (face) the scanning signal lines GL and the video signal lines DL as in the prior art. Here, in FIG. 3(b) also, the light blocking film BM extends in the hatched region, and white rectangular regions surrounded by the light blocking film BM are openings through which light from a backlight unit, for example, transmits, and are regions which are responsible for the gradation display in each pixel.

In the liquid crystal display panel 1 according to the present example, the number of the scanning signal lines GL is reduced to half of the number of pixels included in one pixel column, and therefore, any components which block external light (for example, TFT elements) are not provided in the border between two pixels which are provided between two adjacent scanning signal lines GL (pixel border PB). Therefore, it is not necessary to provide a light blocking film in the locations which face the pixel border PB, and thus, one opening can be provided for two pixels placed between two adjacent scanning signal lines GL (one pixel region). At this time, one opening for two pixels located between two adjacent scanning signal lines GL becomes wider by the portion of the light blocking film for the division into the two pixels which is omitted as shown in FIG. 2(b), for example. Therefore, in the liquid crystal display panel 1 according to the present example, the ratio of the opening in each pixel becomes higher than that shown in FIG. 2(b), and thus, the screen can be prevented from becoming darker.

Figure 4A:
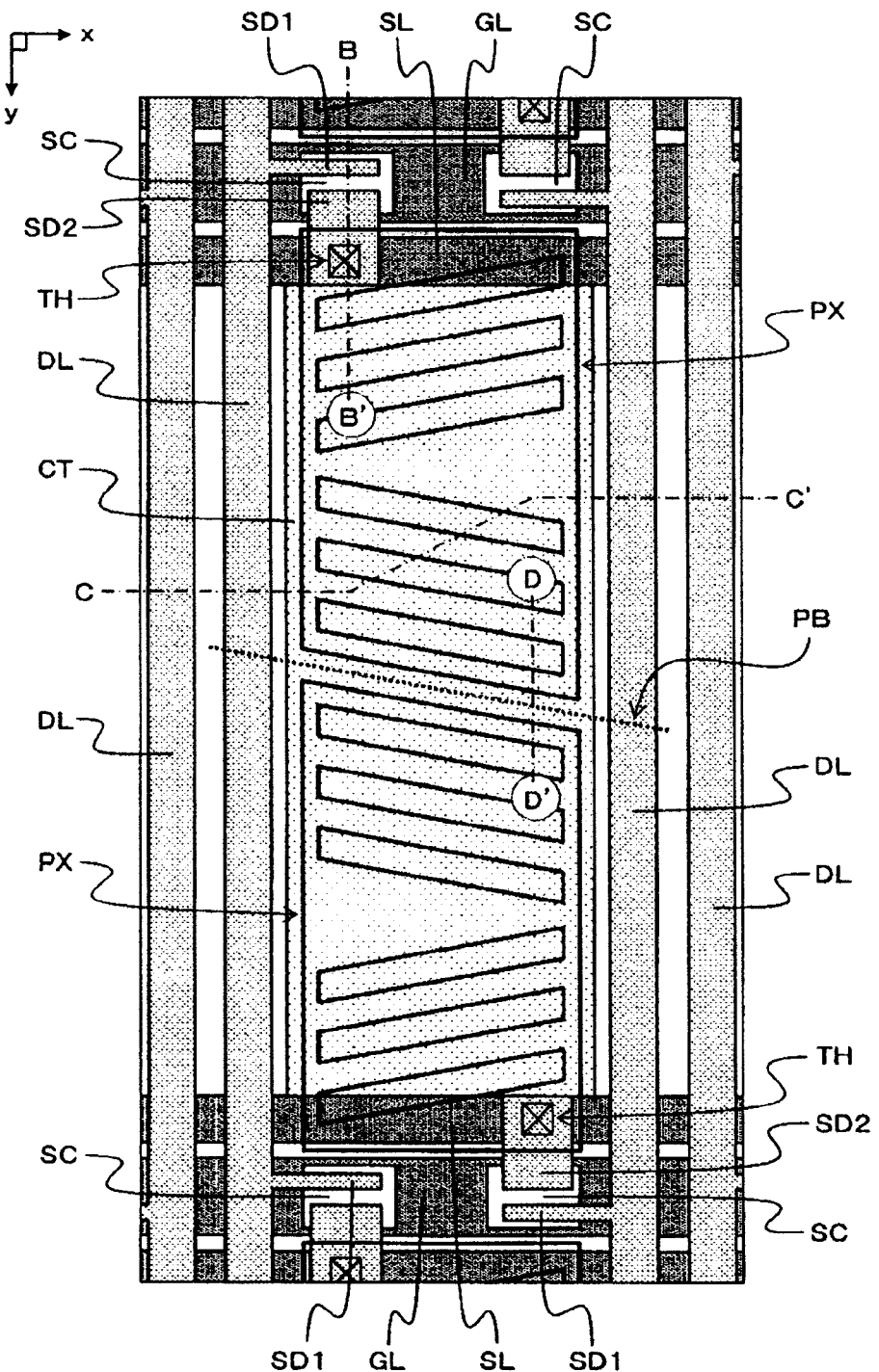
FIG. 4(a) is a schematic plan diagram showing an example in a plan layout of two pixels sandwiched between two adjacent scanning signal lines in a TFT substrate.
Figure 4B:
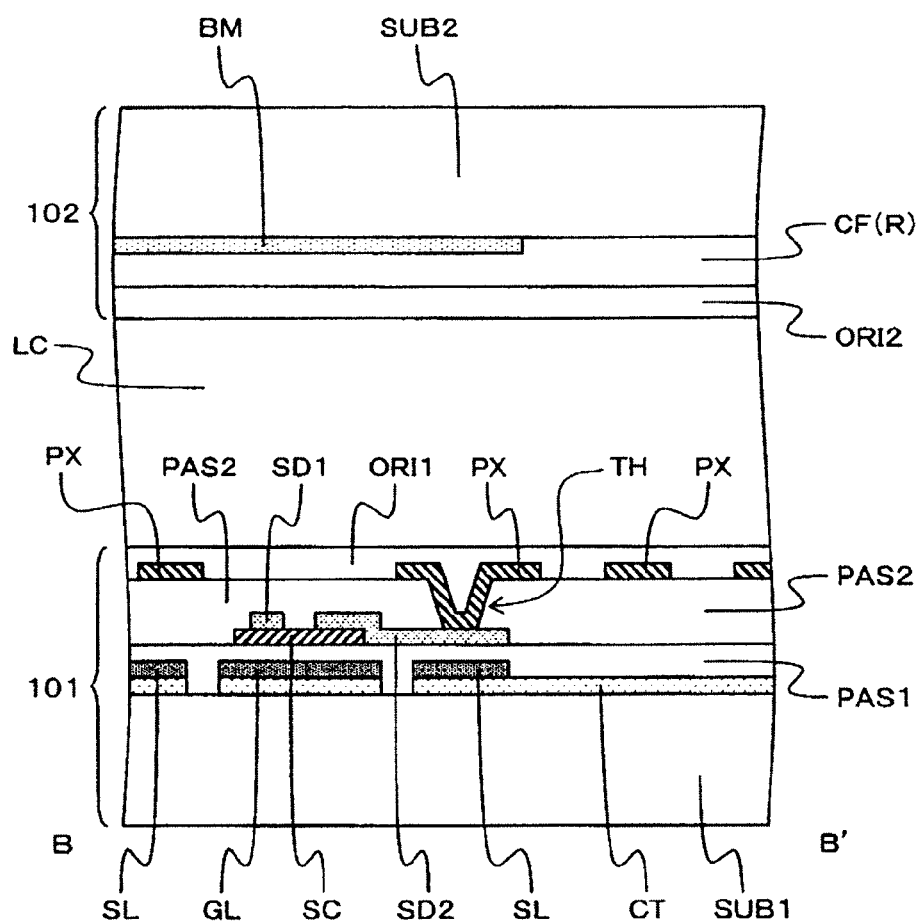
FIG. 4(b) is a schematic cross sectional diagram showing an example of the configuration of a liquid crystal display panel along line B-B' in FIG. 4(a)
Figure 4C:
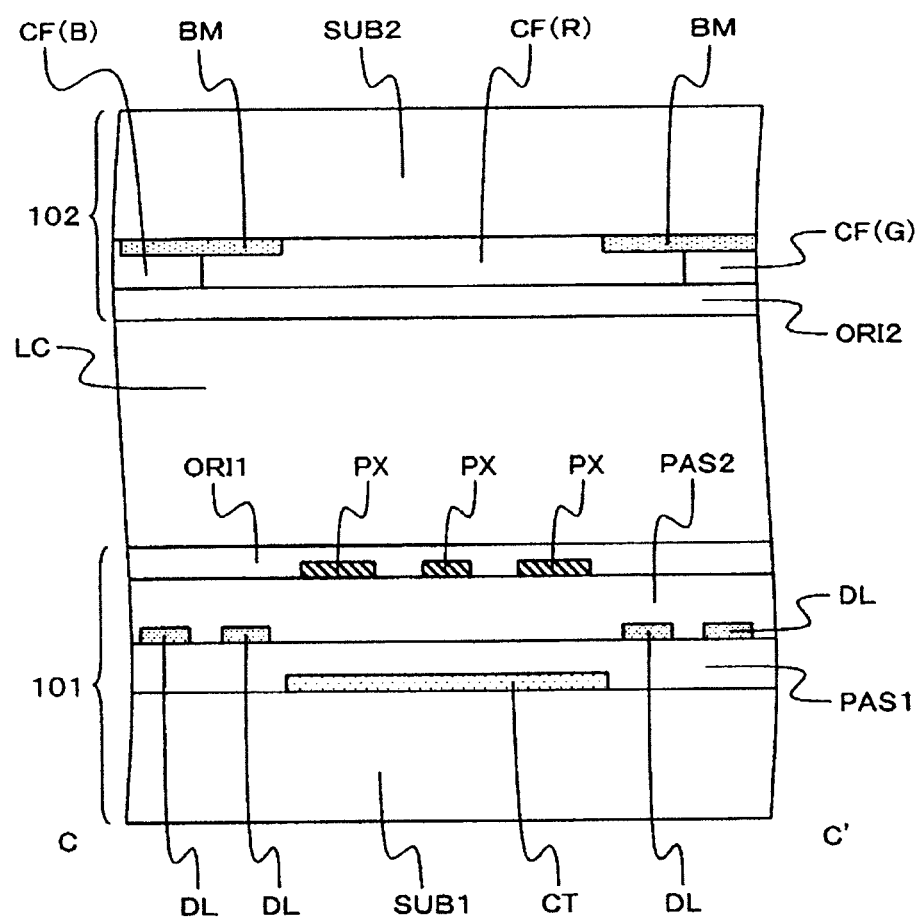
FIG. 4(c) is a schematic cross sectional diagram showing an example of the configuration of a liquid crystal display panel along line C-C' in FIG. 4(a)
Figure 4D:
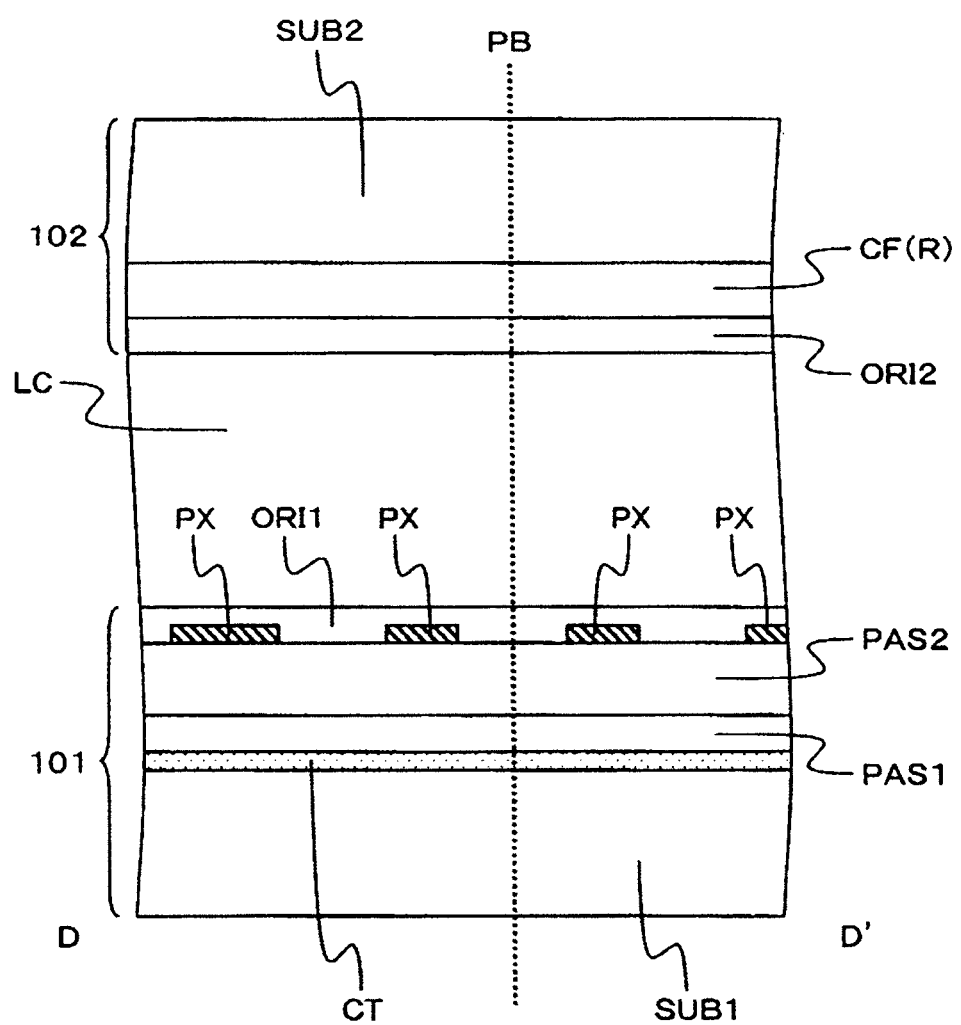
FIG. 4(d) is a schematic cross sectional diagram showing an example of the configuration of a liquid crystal display panel along line D-D' in FIG. 4(a)

FIGS. 4(a) to 4(d) are schematic diagrams showing an example of the configuration of the TFT substrate in the liquid crystal display panel according to the present example. FIG. 4(a) is a schematic plan diagram showing an example of the plan layout for two pixels sandwiched between two adjacent scanning signal lines in the TFT substrate. FIG. 4(b) is a schematic cross sectional diagram showing an example of the configuration of the liquid crystal display panel along line B-B' in FIG. 4(a). FIG. 4(c) is a schematic cross sectional diagram showing an example of the configuration of the liquid crystal display panel along line C-C' in FIG. 4(a). FIG. 4(d) is a schematic cross sectional diagram showing an example of the configuration of the liquid crystal display panel along line D-D' in FIG. 4(a).

In the case where the circuit configuration of the liquid crystal display panel according to the present example is applied to a liquid crystal display panel of a lateral electrical field drive system, FIGS. 4(a) to 4(d) show the plan layout of the TFT substrate 101 and the cross sections of the configuration of the liquid crystal display panel, for example.

The TFT substrate 101 is a substrate where scanning signal lines GL, video signal lines DL, TFT elements Tr, pixel electrodes PX, counter electrodes CT and an orientation film ORI1 are layered and provided on the surface of an insulating substrate SUB1, such as a glass substrate, and the counter electrodes CT, the scanning signal lines GL and the capacitance holding lines SL are first formed on the surface of the insulating substrate SUB. The counter electrodes CT are formed by etching a conductive film having a high light transmittance, for example, an ITO film. The scanning signal lines GL and the capacitance holding lines SL are formed by etching a conductive film, for example, an aluminum film. At this time, an ITO film and an aluminum film are formed in sequence on the entire surface of the insulating substrate SUB, and after that, the aluminum film is first etched so that the scanning signal lines GL and the capacitance holding lines SL are formed, and then, the ITO film is etched so that the counter electrodes CT are formed.

Here, an ITO film may be formed and etched so that the counter electrodes CT are formed, and after that, an aluminum film may be formed and etched so that the scanning signal lines GL and the capacitance holding lines SL are formed.

Furthermore, an aluminum film may be formed and etched so that the scanning signal lines GL and the capacitance holding lines SL are formed, and after that, an ITO film may be formed and etched so that the counter electrodes CT are formed.

A first insulating layer PAS1, which functions as the gate insulating film of the respective TFT elements, is formed on the surface of the insulating substrate SUB on which the counter electrodes CT and the scanning signal lines GL are formed. The first insulating layer PAS1 is formed of a silicon oxide film or a silicon nitride film, for example.

A semiconductor layer SC for the respective TFT elements, video signal lines DL and the drain electrodes SD1 and the source electrodes SD2 of the respective TFT elements are formed on the first insulating layer PAS1. The semiconductor layer SC is formed by etching a semiconductor film, such as of amorphous silicon or polycrystal silicon, for example. The video signal lines DL as well as the drain electrodes SD1 and the source electrodes SD2 of the respective TFT elements are formed by etching a conductive film, such as an aluminum film. At this time, the video signal lines DL as well as the drain electrodes SD1 and the source electrodes SD2 of the respective TFT elements are formed after the semiconductor layer SC and part of the drain electrodes SD1 and the source electrodes SD2 extends from the surface of the first insulating layer PAS1 onto the semiconductor layer SC. At this time, the video signal lines DL and the drain electrodes SD1 are integrally formed in general.

A second insulating layer PAS2 and pixel electrodes PX are formed on the surface of the first insulating layer PAS1 on which the semiconductor layer SC and the video signal lines DL are formed, and the pixel electrodes PX are connected to the source electrodes SD2 via through holes TH. The second insulating layer PAS2 is formed of a silicon oxide film, a silicon nitride film, other organic insulating films or inorganic insulating films, for example. In addition, the pixel electrodes PX are formed by etching a conductive film having a high light transmittance, for example, an ITO film.

In addition, in the case of a liquid crystal display panel of a lateral electrical field drive system having such a configuration in the cross section, the pixel electrodes PX are in comb form in the plan view where a number of slits (openings) are provided in the regions which overlap the counter electrodes CT.

At this time, in the case where two pixel electrodes PX sandwiched between two adjacent scanning signal lines GL have such a form in the plan view that the pixel border PB crosses the direction in which the scanning signal lines GL extend as shown in FIG. 4(a), for example, a change of color from one pixel to the other (gradation) becomes gradual in the vicinity of the pixel border PB.

Meanwhile, the facing substrate 102 is a substrate where a light blocking film BM, color filters CF and an orientation film ORI2 are layered and provided on the surface of an insulating substrate SUB2, such as a glass substrate, and the light blocking film BM is first formed on the surface of the insulating substrate SUB2, for example. The light blocking film BM is formed by etching a conductive film having high light blocking properties, for example, of chromium.

In addition, as shown in FIGS. 4(b) and 4(c) for example, the light blocking film BM is provided in and extends into such locations as to overlap (face) the scanning signal lines GL and the video signal lines DL in the facing substrate 102. At this time, the light blocking film BM in such locations as to overlap the scanning signal lines GL are formed so as to cover two capacitance holding lines SL which run with the scanning signal lines GL in between, for example.

In addition, color filters CF are provided on the surface of the insulating substrate SUB2 on which the light blocking film BM is formed, for example. The color filters CF are formed so as to have the same base color in the opening regions of a number of pixels which are aligned in the direction in which the video signal lines DL extend, for example, and have different base colors alternately in the opening regions of a number of pixels which are aligned in the direction in which the scanning signal lines GL extend. That is to say, in the case of an RGB type color liquid crystal display panel, all the opening regions of the number of pixels aligned in the direction in which the video signal lines DL extend are any of the following three colors: red (R), green (G) and blue (B). In addition, as for the number of opening regions aligned in the direction in which the scanning signal lines DL extend, red opening regions, green opening regions and blue opening regions are repeated in this order, for example.

In the case where the TFT substrate 101 has a configuration as described above, as shown in FIG. 4(d) for example, no problem arises with the display of each pixel even when there is no light blocking film BM in the border portion PB between two pixels (pixel electrodes PX) between two adjacent scanning signal lines GL on the facing substrate 102, and therefore, the ratio of the opening of the two pixels can be increased. Thus, even in the case where the area occupied by one pixel becomes smaller due to an increase in the resolution of the liquid crystal display panel, for example, the brightness of the screen can be maintained. In addition, the brightness of the screen can be maintained without using a backlight unit having high brightness, and therefore, an increase in the power consumption can be prevented.

Furthermore, the number of the scanning signal lines GL on the liquid crystal display panel 1 according to the present example is half of that used in the general liquid crystal display panels according to the prior art. Therefore, in the case where the period for one frame in the liquid crystal display device using the liquid crystal display panel 1 according to the present example is set to the same time as in the period of one frame in general liquid crystal devices according to the prior art, the time during which a video signal (gradation voltage) is written in the pixel electrode PX of each pixel can be made approximately two times longer than the time for general liquid crystal display devices according to the prior art. Therefore, unevenness in the picture quality and deterioration in the picture quality due to a lack of writing can be reduced in the liquid crystal display device using the liquid crystal display panel 1 according to the present example, for example.

Conversely, in the case where the time during which a video signal (gradation voltage) is written in the pixel electrode PX of each pixel in the liquid crystal display device using the liquid crystal display panel 1 according to the present example is set to be the same as that in the general liquid crystal display devices according to the prior art, the period for one frame can be made approximately half of the period for one frame in the general liquid crystal display devices according to the prior art. Therefore, it is easy to increase the speed of display (drive), for example, in the liquid crystal display device using the liquid crystal display panel according to the present example.

Figure 5:
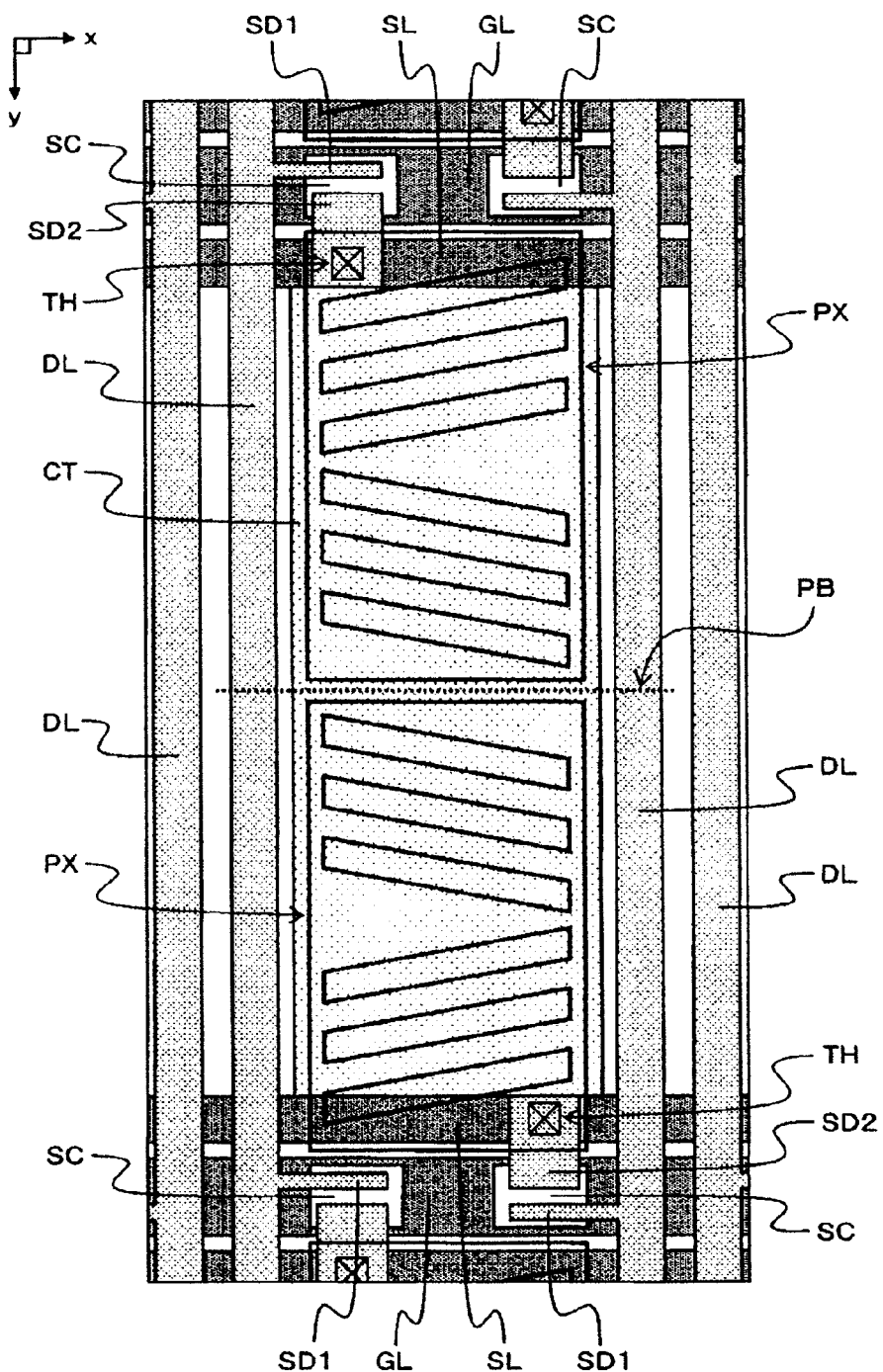
FIG. 5 is a schematic plan diagram showing a modification of the plan layout shown in FIG. 4(a).

FIG. 5 is a schematic plan diagram showing a modification of the plan layout shown in FIG. 4(a).

As an example of a plan layout of the TFT substrate 101 in the liquid crystal display panel 1 according to the present example, FIG. 4(a) shows an example where two pixel electrodes PX sandwiched between two adjacent scanning signal lines GL have such a form in a plane that the pixel border PB becomes diagonal relative to the direction in which the scanning signal lines GL extend.

However, the form of the two pixel electrodes PX in a plane sandwiched between two adjacent scanning signal lines GL is not limited to this, and as shown in FIG. 5 for example, the pixel border PB may of course have such a form as to be approximately parallel to the direction in which the scanning signal lines GL extend.

In addition, in the TFT substrate 101 according to the present example, the forms in a plane of the semiconductor layer SC, the drain electrode SD1 and the source electrode SD2 in the TFT elements TR and the direction and the number of slits in the pixel electrodes PX can of course be changed in an appropriate manner.

Furthermore, though an example of a plan layout on the TFT substrate 101 and a configuration of the liquid crystal display panel 1 in the cross section are cited in the case where the present example is applied to a liquid crystal display panel 1 of a lateral electrical field drive system, the invention is not limited to this, and the arrangement can of course be applied to a liquid crystal display panel 1 of a longitudinal electrical field drive system.

Though the present invention is concretely described on the basis of the above described example, the present invention is not limited to the above described example, and various modifications are of course possible within the scope from which the gist of the invention is not deviated.

Though an example where the present invention is applied to a liquid crystal display panel (liquid crystal display device) is cited as the above described example, the invention is not limited to this, and the present invention can be applied to a display panel having a configuration similar to the above described liquid crystal display panel (for example, organic EL display panel).

The invention claimed is:

1. A liquid crystal display device, comprising:
   a first substrate and a second substrate which sandwich a liquid crystal material,
      a number of video signal lines, a number of scanning signal lines, a number of TFT elements and pixel electrodes connected to the TFT elements being formed on the first substrate; and
      pixel regions being formed in a matrix with regions surrounded by two of the video signal lines and two of the scanning signal lines, two TFT elements are formed in each of the pixel regions, and two pixel electrodes are formed in each of the pixel regions, the two pixel electrodes being connected to different ones of the two TFT elements in the pixel region;
   wherein one counter electrode is formed in each of the pixel regions, the counter electrode being formed between a layer of the pixel electrode and the first substrate;
   wherein each pixel electrode in the pixel regions has a number of slits, the slits in each pixel electrode extending in two directions and the slits extend in a direction which is not parallel to an extending direction of either of the video signal lines or the scanning signal lines;
   wherein in the two pixel electrodes in one pixel region, adjacent pixel electrode sides which face one another of each of the two pixel electrodes are parallel to each other;
   wherein another two adjacent TFT elements in a direction of extension of the video signal lines are connected to one of the scanning signal lines; and
   wherein the two TFT elements in the one pixel region are adjacent in the direction of extensions of the video signal lines, and each of the two adjacent TFT elements is connected to a different video signal line of the two video signal lines.

2. The liquid crystal display device according to claim 1, wherein the adjacent pixel electrode sides of each of the two pixel electrodes of the one pixel region are not parallel to either of the video signal lines or the scanning signal lines.

3. The liquid crystal display device according to claim 1, wherein non-adjacent sides of the two pixel electrodes in the one pixel region are parallel to either of the video signal lines or the scanning signal lines.

4. The liquid crystal display device according to claim 1, wherein the two TFT elements in one of the pixel regions are respectively formed above two scanning signal lines provided within the pixel region so as to face each other.

5. The liquid crystal display device according to claim 1, wherein the two TFT elements are formed between the video signal lines and above the scanning signal lines.

6. The liquid crystal display device according to claim 1, wherein two video signal lines are formed between the pixel regions.

7. The liquid crystal display device according to claim 1, wherein a light blocking film is formed on the second substrate, the light blocking film being formed in such locations as to overlap the video signal lines and the scanning signal lines.

8. The liquid crystal display device according to claim 1, wherein the adjacent pixel electrode sides of the two pixel electrodes in the one pixel region are adjacent pixel electrode sides of the two pixel electrodes which face one another.

9. The liquid crystal display device according to claim 2, wherein the adjacent pixel electrode sides of the two pixel electrodes in the one pixel region are adjacent pixel electrode sides of the two pixel electrodes which face one another.

10. The liquid crystal display device according to claim 3, wherein the non-adjacent sides of the two pixel electrodes in the one pixel region are sides of the two pixel electrodes which do not face one another.

11. The liquid crystal display device according to claim 1, wherein each of the another two adjacent TFT elements is arranged in an adjacent pixel region in the direction of extension of the video signal lines.

12. The liquid crystal display device according to claim 11, wherein the another two adjacent TFT elements are formed between two video signal lines, each of the two TFT elements being connected to a different one of the pixel electrodes of different pixel regions.

* * * * *